(12) United States Patent
Rapala

(10) Patent No.: US 6,209,392 B1
(45) Date of Patent: Apr. 3, 2001

(54) FUEL LEVEL SENSOR WITH MINIATURIZED CERAMIC RESISTOR CARD

(75) Inventor: Gregg R. Rapala, Arlington Heights, IL (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 09/224,610

(22) Filed: Dec. 31, 1998

(51) Int. Cl.[7] .............................. G01F 23/36; G01F 23/32
(52) U.S. Cl. .................................. 73/317; 73/313; 338/33
(58) Field of Search ......................... 73/313, 317; 338/33

(56) References Cited

U.S. PATENT DOCUMENTS 1,611,480 * 12/1926 Meroni ..................................... 73/313
4,557,144 * 12/1985 Lucchini ............................. 73/317 X
5,341,679 * 8/1994 Walkowski et al. ..................... 73/317

FOREIGN PATENT DOCUMENTS

965459 * 4/1948 (FR) ...................................... 73/313

* cited by examiner

Primary Examiner—Daniel S. Larkin
(74) Attorney, Agent, or Firm—Steven M. Evans; David L. Newman

(57) ABSTRACT

A fuel level sensor is provided having a contact arm pivotally mounted to a frame adjacent a cam that translates the pivotal motion of the arm into a linear motion so that a contact arm may move linearly across a miniaturized resistor card.

8 Claims, 2 Drawing Sheets

FUEL LEVEL SENSOR WITH MINIATURIZED CERAMIC RESISTOR CARD

The present invention pertains to a fuel level sensor and in particular a sensor providing for a compact assembly having a miniaturized ceramic resistor card.

BACKGROUND OF THE INVENTION

Fuel level sensors are known for detecting the fuel level in gasoline tanks of automobiles, which include an arm having a buoyant member at the end. The arm is pivotally mounted to a frame assembly and at the end of the arm opposite the buoyant member is a contact member. Mounted below the contact member is a ceramic resistor card. The ceramic resistor card includes multiple traces that typically extend out like the spokes of a wheel in an arc that is approximately 120°. As the level of the fuel changes, the buoyant member moves up and down and causes the arm to which it is attached to change its angle and therefore move the contact along the arc shaped conductive traces of the ceramic resistor card, which then sends a signal to the fuel level indicator. Due to the simplified nature of the arm having the direct motion imparted to the ceramic resistor card, the card must be formed on a large scale with the circuit traces best being formed in an arc. The ceramic resistor card having resistors associated therewith is generally the most expensive component of the fuel level sensor. Therefore, it would be advantageous to provide for a fuel level sensor that has a smaller ceramic resistor card. A fuel level sensor that is orientated and assembled in a different manner would allow for the ceramic resistor card to be greatly reduced in size and therefore reduce the cost of this sensor.

Therefore, it is an object of the present invention to provide for a fuel level sensor having a miniaturized ceramic resistor card. It is another object of the present invention to provide for a fuel level sensor that does not require the ceramic resistor card to be best formed with conductive traces in an arc shape.

It is a further object of the present invention to provide for a fuel level sensor having a cam attached at the pivot end of the fuel level sensor arm in order to transform the arcing motion of the arm to a linear motion.

SUMMARY OF THE INVENTION

A fuel level sensor is provided having an arm pivotally mounted to a frame. A buoyant member is mounted at a first end of the arm. A cam member is mounted at the second end of the arm adjacent a pivot point for the arm. A cam member engages a contact arm that moves linearly. A contact finger is attached to the contact arm and makes contact to a ceramic resistor card mounted adjacent the contact arm. The ceramic resistor card includes conductive traces arranged in parallel lines along its length so that as the fuel level sensor arm pivots it will impart its motion to the contact arm which moves linearly and causes the contact figure to move linearly across the conductive traces of the ceramic resistor card and change the resistance measurement which is transmitted to the fuel level gauge. In an embodiment, the cam member has a helical shape so that when the arm is pivoted in a circular motion it is transferred to the contact arm. In an embodiment, the cam member includes a semi-circular shaped slot. The contact arm includes a cylindrical pin that is inserted within the slot and upon rotation of the cam member the pin is moved through the slot in order to transfer a linear motion to the contact arm.

DETAILED DESCRIPTION OF THE PRESENTLY PREFERRED EMBODIMENTS

Figure 1:
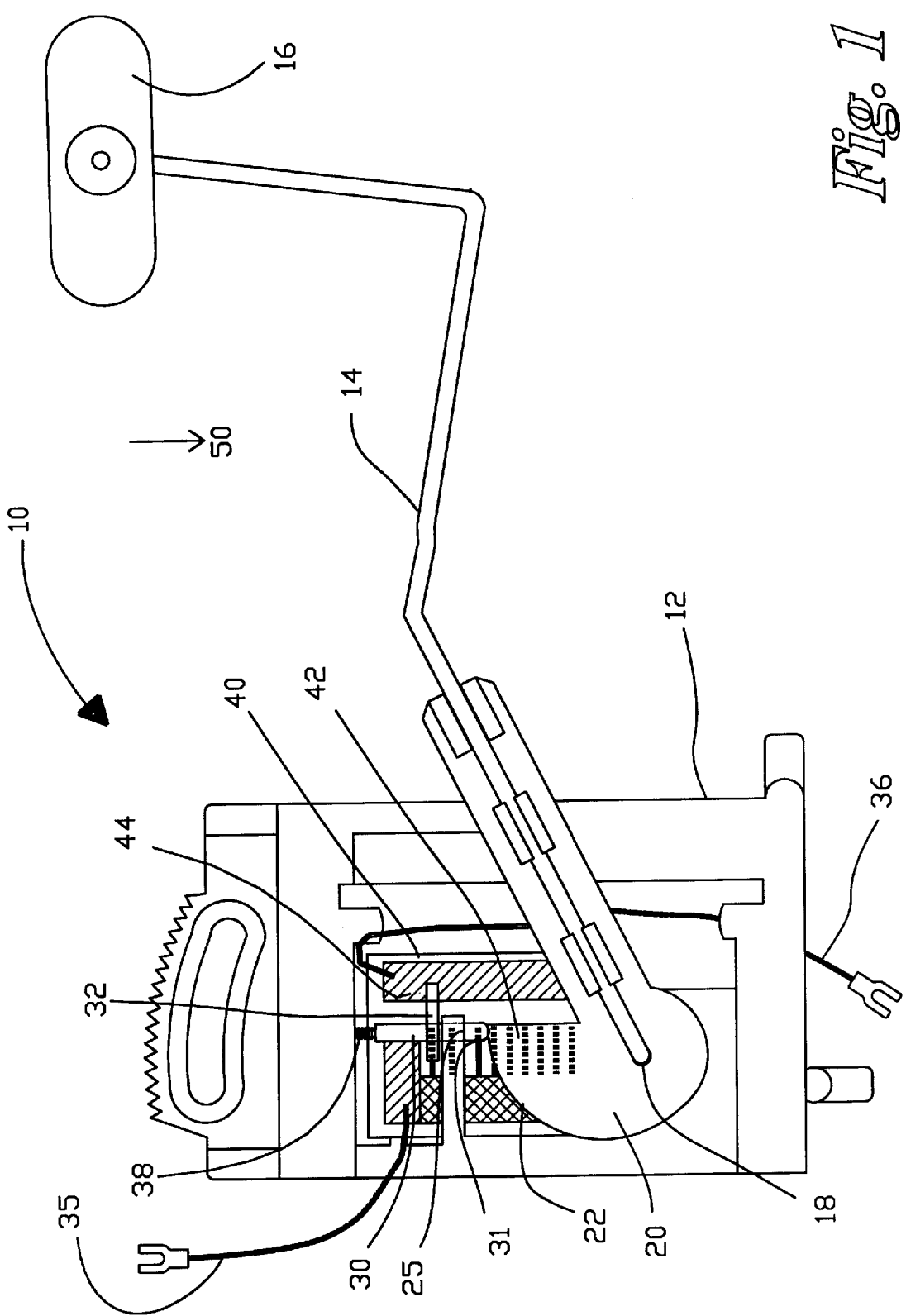
FIG. 1 is a plan view of the fuel level sensor of the present invention.

FIG. 1 discloses a fuel level sensor 10 having a frame 12. The fuel level sensor 10 may be mounted in the gasoline tank of an automobile. Pivotally mounted to the frame is an arm 14. At a first end of the arm is a buoyant member 16. At a second end opposed to the buoyant member 16 is a pivot point 18. Attached to the arm adjacent the pivot point is cam 20. In a preferred embodiment, the frame 12 is formed of a plastic material such as acetal copolymer, for example CELEON® (Hoechst), arm 14 is a metallic wire member and buoyant member 16 is such as nitrile rubber ebonite material, for example NITROPHYL® (Rogers Corporation) which is pivotally mounted to the end of the arm 14. FIG. 1 discloses the fuel level sensor having the arm 14 in its uppermost position. In other words, in the position shown in FIG. 1, the fuel tank would be "full" and the buoyant member 16 would be floating at the top of the fuel tank. As the fuel level is reduced, the buoyant member 16 would move in the direction of arrow 50 or downward.

The cam member 20 is shaped so that its external surface 22 is helical in shape so that as the arm 14 moves downward the outer surface 22 of the cam 20 becomes further away from fixed point 25. Fixed point 25 is on a mounting member attached to the frame 12. Mounted to the mounting member 25 is a contact arm 30. A contact finger 32 is attached to the contact arm 30. The contact arm 30 is mounted beneath the mounting member 25 so that the contact finger 32 may move freely along the resistor card on either side of the mounting member 25. A contact finger 32 abuttingly contacts the surface of the ceramic resistor card 40. The ceramic resistor 40 card includes conductive traces 42, which are, aligned parallel along the length of the ceramic resistor card 40. The contact arm 30 is mounted in the mounting member 25 so that the first end 31 of the contact arm abuttingly contacts the outer surface 22 of the cam 20 and has a spring member 38 at its second end. The mounting member 25 holds the contact arm 30 in position, allowing linear motion at the contact arm 30.

As the arm 14 rotates and the outer surface 22 of the cam 20, rotates, it will become farther away from fixed point 25 and therefore cause the contact arm 30 to move in a linear direction toward the cam 20. The contact finger 32 attached to the contact arm 30 will also move with the contact arm in the same direction as contact arm 30. The contact finger 32 is formed of a conductive material. In a preferred embodiment, the contact finger 32 simultaneously rides along the conductive traces 42 and a conductive commutator trace 44. In a preferred embodiment, thick film paste is fired to the circuit card 40 in order to provide for the resistive element. However, discreet resistors such as flip chips or other resistive elements may be provided. The ceramic card 40 in a preferred embodiment is formed of a ceramic material, such as 96% alumina which will not degrade in the corrosive environment of a fuel tank.

As the contact finger 30 moves in the direction of arrow 50, the contact finger will move linearly from one conductive trace 42 to the next. As the contact finger is moved, the resistive value will change, or decrease, changing the current that is transmitted through wires 35 and 36 and likewise effecting the fuel level gauge. It can be seen that the arrangement of the fuel level sensor 10 allows for the ceramic resistor card 40 to be very small. For example, in an embodiment, the ceramic resistor card 40 may have an area of approximately 150–300 mm. As well, the formation of the conductive traces 42 in a linear arrangement allows for easy production methods of the ceramic resistor card 40. Such arrangement allows for larger multi-up manufacturing of the ceramic resistor cards, and more inexpensively. Thus, it can be appreciated that the fuel level sensor assembly 10 of the present invention provides for a low cost component.

Figure 2:
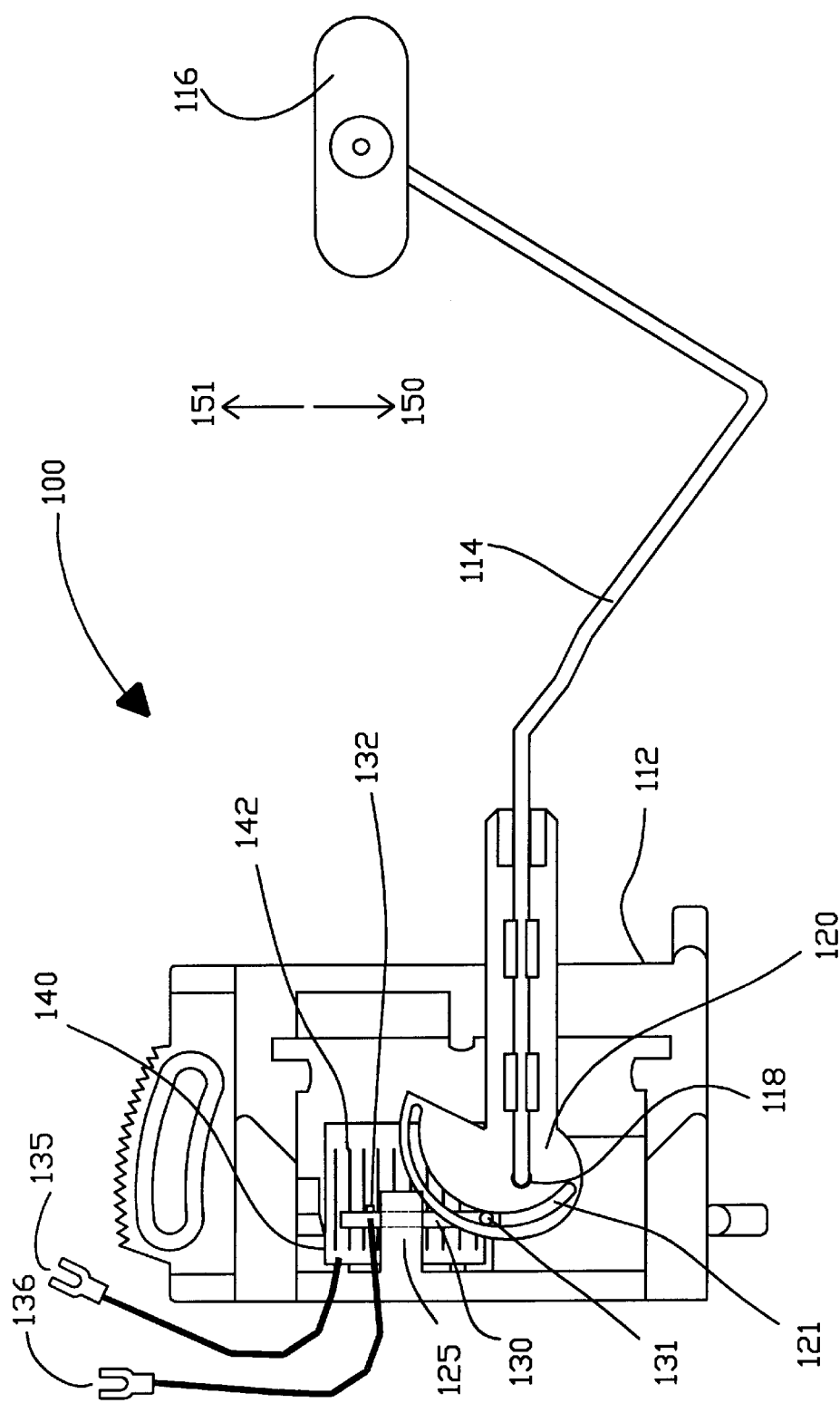
FIG. 2 is a plan view of an additional embodiment of a fuel level sensor of the present invention.

Turning to FIG. 2, an alternate embodiment of the present invention is shown having a frame 112 and arm 114, and a buoyant member 116. The arm 114 is mounted to the frame 112 at a pivot point 118 by a cam 120. As discussed above for FIG. 1, the cam 20 is helical in shape. The cam 120 in this embodiment includes a slot 121 formed therein. The contact arm 130 includes a pin 131 that protrudes through the slot 121. The contact arm 130 is mounted to a mounting member 125. The contact arm includes a contact finger 132. Similar to the operation of the contact arm 30 in the embodiment shown in FIG. 1, in this embodiment as the arm 114 is moved the pin 131 will move within slot 121 transferring a linear motion to the contact arm 130 and causing the contact finger 132 to move along conductive traces 142 of the ceramic resistor card 140. It can be seen that no spring member is required to be attached to the contact arm 130 in that the pin 131 movement is reversed in the slot 121 it will cause the contact arm to return to its previous position. The embodiment of FIG. 2 is shown having the fuel level sensor 100 in an intermediate position. Therefore, the buoyant member 116 may move up in the direction of arrow 151 or down in the direction of arrow 150. Likewise, the contact finger 132 will also move up or down from the position shown in FIG. 2. Therefore, as the fuel level increases, the buoyant member 116 will move in direction of arrow 151, upward and likewise will cause the contact arm 130 to pivot causing the pin 131 to move within slot 121 likewise causing the contact arm 130 to move upward and the contact finger 131 upward along the conductive traces 142. The movement of the contact fmger 132 along the conductive traces 142 changes the current transmitted through wires 135, 136 and likewise effecting a fuel gauge to which the wires are electrically connected.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A fluid level sensor comprising:

a frame;

an arm pivotally mounted to the frame at a first end of the arm;

a buoyant member attached to the arm at the second end;

a cam attached to the arm at the first end at a pivot point;

a contact arm abutting the cam;

a resistor card attached to the frame having conductive traces adhered thereto that are aligned parallel to one another along the length of the resistor card; and a contact finger attached to the contact arm, wherein upon movement of the arm the cam rotates around the pivot point causing the contact arm to move and causing the contact finger to slide along the conductive traces of the resistor card in order to provide a change in resistance value.

2. The fuel level sensor of claim 1 wherein the cam includes an outer surface having a helical shape and the contact arm having a first end that rides along the outer surface of the cam.

3. The fuel level sensor of claim 1 wherein the cam includes a slot having a helical shape and the contact arm having a post that protrudes through the slot of the cam.

4. The fuel level sensor of claim 1 wherein the resistor card is formed of a ceramic material and includes thick film resistors adhered thereto.

5. The fuel level sensor of claim 1 wherein a spring is mounted to the contact arm.

6. The fuel level sensor of claim 1 wherein buoyant member is pivotally mounted to the arm and the buoyant member is nitrile rubber ebonite material.

7. The fuel level sensor of claim 1 wherein the resistor card has an area of less than 300 square millimeters.

8. The fuel level sensor of claim 1 wherein the frame is made of plastic.

* * * * *